UNITED STATES PATENT OFFICE.

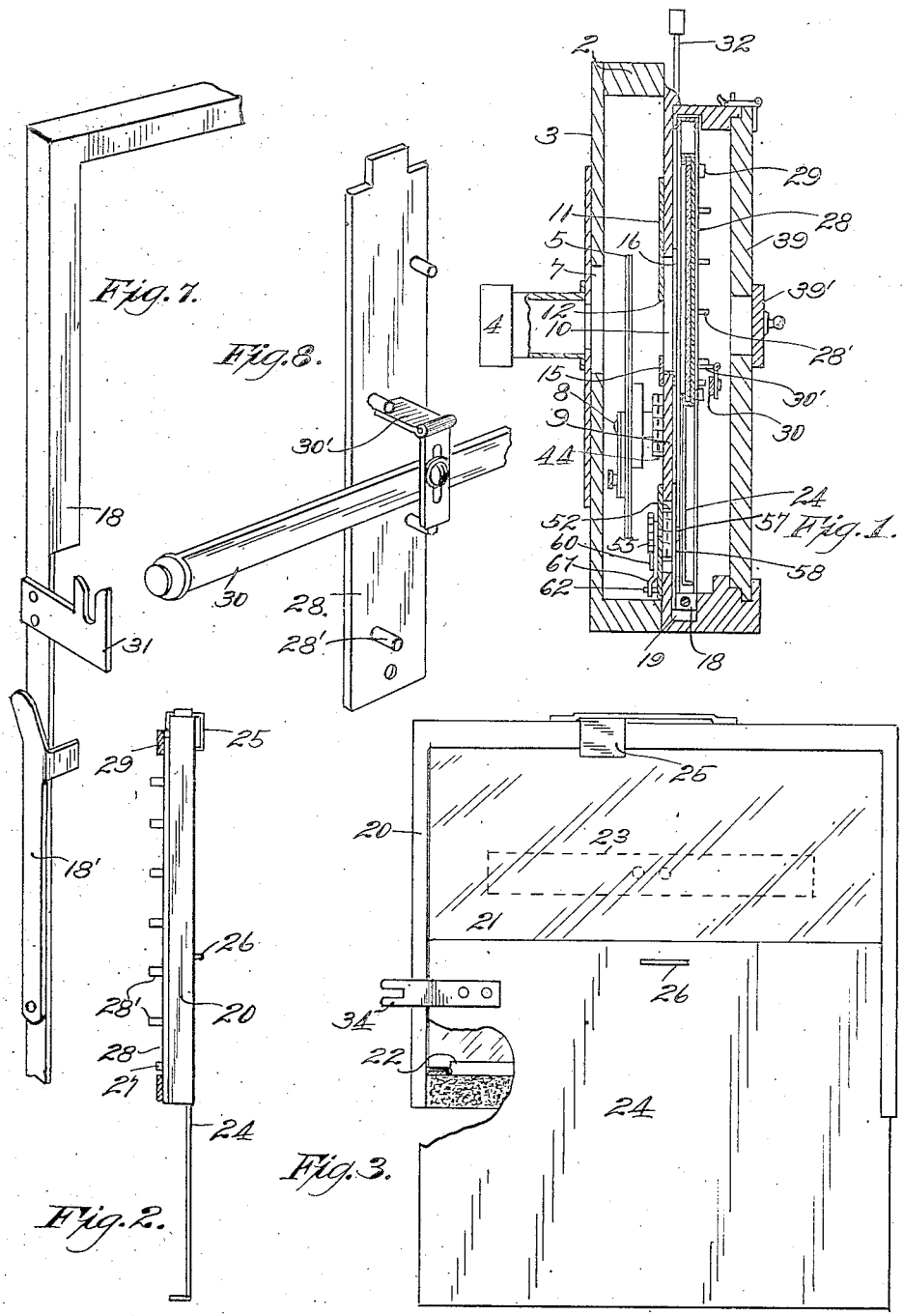

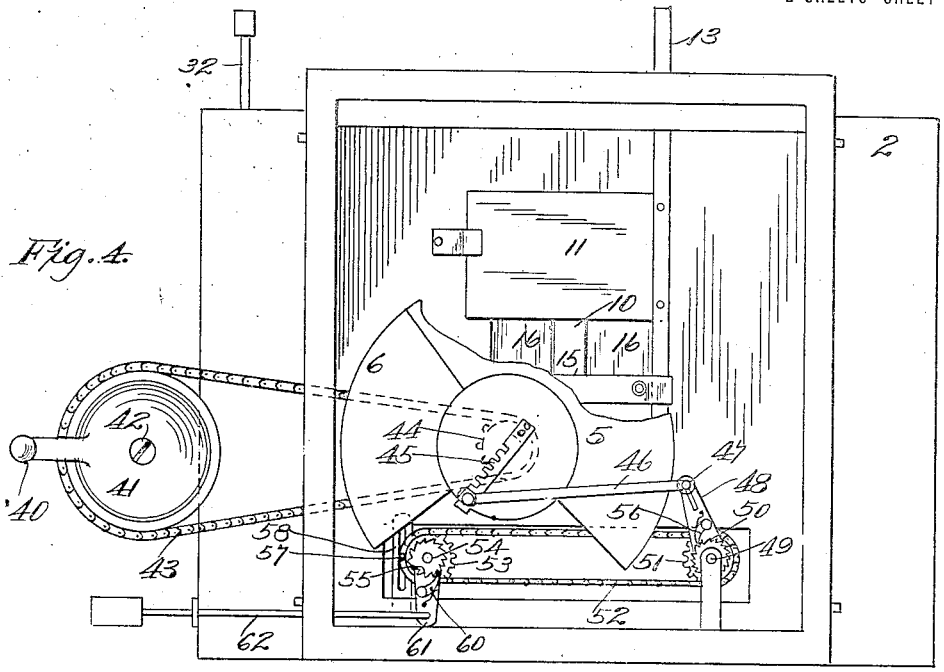
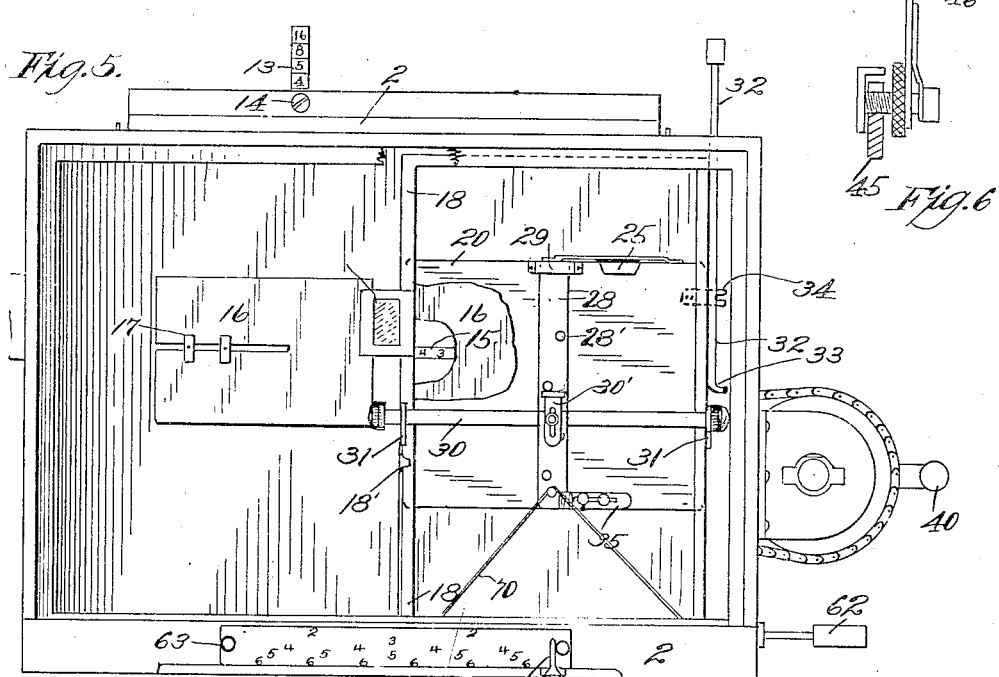

JAMES W. ANDERSON, OF SAN FRANCISCO, CALIFORNIA.

MULTIPLYING-CAMERA.

1,158,019.  Specification of Letters Patent.  Patented Oct. 26, 1915.

Application filed February 25, 1914. Serial No. 821,084.

*To all whom it may concern:*

Be it known that I, JAMES W. ANDERSON, a citizen of the United States, residing in the city and county of San Francisco and State of California, have invented new and useful Improvements in Multiplying-Cameras, of which the following is a specification.

This invention has reference to photographic apparatus, and relates to a camera for making multiple or consecutive views upon plates, films or other sensitized surfaces in more or less rapid succession.

The object of the present invention is to provide a camera, or camera attachment, which will enable an operator to make a series of exposures, on a sensitized medium, of objects which may be stationary or moving.

A particular object of the invention is to provide a simplified form of mechanism for the consecutive exposing of areas of a sensitized plate; means being provided whereby the plate can be moved mechanically or by hand.

The invention consists of the parts and the construction and combination of parts as hereinafter more fully described and claimed, having reference to the accompanying drawings, in which—

Figure 1 is a transverse vertical section through the camera. Fig. 2 is an edge view of the improved plate-holder. Fig. 3 is a front view of the plate-holder, partly in section, the slide being lowered to expose the plate. Fig. 4 is a front view of the attachment showing the rotary shutter and the carriage-actuating mechanism. Fig. 5 is a rear view of the camera with the back removed, parts being in section. Fig. 6 is a detail view of the adjustable crank. Fig. 7 is a detail view of a part of the carriage frame. Fig. 8 is a detail view of the plate-holder drop device.

In its illustrated embodiment, the invention comprises, as shown in Fig. 1, a suitable frame or casing 2, having a removable front 3 to which may be attached a lens 4, or other suitable camera apparatus. The box or frame 2 is of sufficient height, width and thickness to provide an ample interior space or chamber, in which may swing a rotary shutter 5, having an adjustable section or sector 6 which may be moved relative to the main part 5 so as to form an exposing aperture between the radial edges of the members 5 and 6 so that light may pass through from an aperture 7 in the front 3 of the camera.

The shutter member 5 is rigidly secured on a shaft 8, appropriately journaled on a wall 9 extending transversely across the casing or box 2, and in which wall is formed an aperture 10 of suitable size. The wall 9 supports on its front side a vertically adjustable light stop 11, the lower horizontal edge 12 of which may be moved relative to the aperture 10 for increasing vertically the size of the aperture; the vertically movable stop 11 being provided with an upwardly extending bar projecting above the top of the box 2, and which may be secured in its adjusted position by a screw 14 or other appropriate device.

Attached on the front of the wall 9 is a light stop or strip 15, designed to form the lower horizontal edge of the aperture 10 in the wall 9. In order to adjust the width of the opening 10 in the wall 9, I have provided horizontally adjustable stops 16 which may be moved toward or from each other and are mounted on suitable friction supports 17. If a wide or narrow opening 10 is desired, the horizontally adjustable strips 16 are accordingly adjusted toward or from the vertical center of the wall 9, and if the vertical end of the aperture 10 is to be adjusted, the vertically adjustable stop 11 is correspondingly moved.

Immediately in the rear of the transverse vertical wall 9 of the box 2 there is provided a carriage 18, formed of a rectangular frame of channel material; the carriage extending vertically and traveling in suitable bearings or grooves 19, at the top and bottom members of the frame 2, and being of sufficient width to receive a removable plate-holder 20, the width of which will permit its being inserted vertically in the carriage 18 and held by a clip 18'. The vertical length of the plate-holder 20 is such that it may be elevated bodily to the upper portion of the carriage 18 so that the bottom edge of the plate-holder becomes approximately even with the horizontal light stop 15 at the bottom of the aperture 10 in the wall 9.

Referring to Figs. 2 and 3 a clear understanding of the construction of the plate-holder 20 may be had; this being shown in these views as comprising a holder section, designated at 20, into which may be fitted a plate 21 of suitable proportions, the lower edge of which may be pressed under a retaining flange 22 at the bottom of the plate-holder 20. A spring 23 is bowed and secured to the back wall of the plate-holder 20 and is adapted to spring against the inserted plate 21 and force this against the retaining flanges of the plate-holder 20.

Slidable over the exposable area of the plate 21, so as to effectually cover the latter, there is provided a front or slide 24 of sufficient length to be inserted and guided in the sides of the plate-holder 20, and when inserted fully into the plate-holder will effectually cover the plate 21 and will be locked by a slidable catch 25, mounted on the upper edge of the plate-holder 20, this being adapted to shift beneath a rib or lip 26 formed on the outer surface of the slide 24. The back of the plate-holder 20 is provided with a pin 27, which projects outwardly sufficiently to engage interchangeable strips 28, with spaced and staggered pins 28', and which is secured under a strap 29 at the top of the holder.

When it is desired to make exposures of a plate 21, the loaded plate-holder is inserted in its carriage 18, this having been moved toward the right-hand side at the rear of the camera, as shown in Fig. 5. The plate-holder 20 is then adjusted vertically to its uppermost position in the carriage 18 by means of a lifter-rod 32, which is vertically movable in the box 2 and has at its lower end a hook or prong 33 adapted to be turned into engagement with a slotted prong 34, Figs. 3 and 5, formed on the plate-holder slide 24.

The operator, after having inserted a plate-holder in the carriage 18, turns the lifting-rod 32 so that its prong 33 will enter the slot of the projection 34, and by then lifting the rod 32 the plate-holder will be elevated to its uppermost position in the carriage 18, at which time the plate-holder lock 25 can be shifted to release the lug 26 and permit the plate-holder slide 24 to be lowered from in front of the plate 21, which is now disposed in the carriage 18, toward the aperture 10 in the wall 9, through which actinic rays will be admitted, as desired, to the plate 21. After having inserted the plate-holder and adjusted it in its uppermost position at the right-hand corner of the camera, in the carriage 18, and unlocked the slide 24, the operator then places a shift bar, Fig. 8, on carriage brackets 31 so that the lower pin 28' of a pin strip will, when lowered, rest upon an adjustable rest 30' secured to the shift bar 30. The purpose of these pins 28' is to determine the distance which the plate-holder 20 will be lowered consecutively during the operation of the camera. In order to have the plate-holder fall this predetermined distance, the operator adjusts the strip 28 upon the plate-holder and locks it in adjusted position by means of the small bolt 35 which is exposed on the lower edge of the plate-holder.

If the operator desires to expose the plate in four vertical rows, he adjusts a pin strip 28 with four staggered pins as they are shown in position in Fig. 8, so that the lower pin 28', on the plate-holder 20, will initially rest upon the rest 30'. Then, during the cycle of operation, as the carriage 18, which is transversely moved toward the left in the camera box, passes toward the opposite side of the camera, the shift bar 30 will shift, when engaging the wall or side of the camera, and move the rest 30' from under the lower pin 28 and into position beneath the next offset pin 28', which then holds the slide in a lower plane. The carriage is then returned to the right making successive exposures meanwhile. As the carriage approaches the side wall the shift bar will be shifted as to the carriage and again release the plate-holder to drop to another level. By the provision of a plurality of the interchangeable strips 28 with different numbers of staggered pins 28', the plate may be divided into any number of horizontal rows of pictures. Having adjusted upon the plate-holder a pin strip 28 with the desired number of pins in it, the operator then adjusts the supporting bar 30 upon its rests on the carriage. He then lowers the plate-holder 20 until the supporting pin 28' rests on the abutment rest 30', and then having unlocked the slide latch 25, lowers the plate-holder slide 24 by means of the rod 32 so as to expose the plate 21. When it is desired to make a number of consecutive exposures of a moving object, the stops 16 are adjusted toward each other so as to make the desired width of opening at 10. Then the back 39 of the camera having been adjusted in place to exclude light before the plate-holder slide 24 was lowered, the operator may focus through a focus window 39' in the back and is ready to begin to make the exposures. This is done by shifting the carriage 18 in successive steps horizontally and transversely across the camera box 2.

During the period of movement of the carrier 18, in which is mounted the plate-holder 20, the shutter 5—6 swings across the aperture 10 to prevent the admission of light rays through the same to the plate 21, exposed in the plate-holder. As the carriage 18 comes to a stop the aperture formed between the radial edges of the shutter 5—6 registers with the aperture 10 of the wall 9 so that the light may be admitted to the plate 21 while this is momentarily at rest.

One of the important features of the present invention is the mechanism whereby the plate-holder carrier 18 is actuated. In the present embodiment, this mechanism is indicated as comprising a hand crank 40, secured to a gear wheel 41 turnable on a suitable axle 42 and driving a chain 43 which passes inwardly through the side of the camera box 2 and engages and drives a pinion 44, which is secured on the shaft 8 of the shutter 5—6, so that, as the crank 40 is revolved, the shaft 8 is driven and the shutter 5 rotated. Connected to the shaft 8 is a slotted arm 45, to which may be connected at different distances from the center of shaft 8 a connecting-rod 46, pivoted at 47 to a lever arm 48, which oscillates on a supporting shaft 49, on which is mounted a ratchet wheel or other gear 50. Secured on the shaft 49 is a sprocket gear 51, driving a sprocket chain 62, whereby power is conveyed to another sprocket wheel 53 which is mounted on a shaft 54, this also being provided with a ratchet wheel 55.

The oscillating lever 48 carries a pawl 56, engageable with the ratchet wheel 50, so that when the connecting-rod 46 pulls the lever arm 48 in one direction, the pawl 56 will engage the ratchet wheel 50 and drive this, with its shaft 49, and move the sprocket chain 52 and through this the sprocket wheel 53. On the return movement of the arm 48 the pawl 56 swings idly over the ratchet wheel 50 and effects no movement of the latter. The sprocket chain 52 forms the actuator whereby the plate-holder carriage 18 is shifted; the sprocket chain 52 being provided with a transversely projecting pin or crank 57, which reciprocates in a slotted arm 58 rigidly secured to the lower portion of the carriage 18, as shown at the bottom of Fig. 1.

When the crank 40 is revolved, motion is transmitted to the shaft 8, which revolves the shutter 5—6, so that during one revolution of this the lever arm 48 is given a right-hand and left-hand oscillation, Fig. 4, and during the latter the ratchet wheel 50 is driven, and by this the actuating chain 52 imparts a sliding movement to the carriage 18 by means of the crank pin 57 engaging the arm 58.

By this construction, when a series of consecutive pictures are to be taken on one of the horizontal rows, the carriage 18 is advanced or shifted, and during the time when the lever arm 48 is making its idle stroke and the plate-advancing carrier 18 is stationary, then the aperture between the radial edges of the shutter 5—6 swings across the aperture 10 through which light may be admitted momentarily to the stationary plate; the movement of the shutter being so timed that the light will be cut off before the next shifting movement of the carrier 18 is begun. The width of a picture in a horizontal row is variable by adjusting the crank stroke of the connecting rod at the slotted arm 45.

Assuming that one is ready to make exposures on the plate 21, the crank 40 is revolved and the plate-holder carriage 18 is shifted its first step toward the left to bring a given area of the plate 21 in front of the aperture 10 in the wall 9. As soon as the plate-holder comes to rest, the aperture of the stop 5—6 swings across the opening 10 and that area of the plate which is adjacent to the aperture is exposed. Then the shutter cuts off the light and the next consecutive movement of the carrier 18 is performed, this continuing successively until a series of exposures have been made on the uppermost part of the plate, when the lowermost pin 28' will ride off of the rest 30' until the next projecting pin 28' of the strip 28 engages the sliding rest 30'. The continued rotation of the crank 40 will shift the plate-holder and carriage 18 to the right in successive consecutive movements. An exposure is made during the period between each movement of the carrier 18 when the plate-holder 20 will again be dropped a predetermined distance by the falling of a pin 28' from that shifting rest 30' on which it was supported.

When the exposures are made by the mechanism driven from the crank 40, they will be of the instantaneous character and the exposures may be made of moving or stationary objects, as desired. Should the operator desire to make time exposures, this can readily be accomplished by shifting the plate-holder carrier 18 by actuating the ratchet wheel 55 through means of a pawl 60, engageable with the ratchet wheel 55 and carried on an oscillating arm 61 mounted on the shaft 54. The arm 61 is connected to a handle 62 projecting through the side of the camera frame 2 and which the operator may reciprocate when he desires to manually shift the carriage 18 to make time exposures. It will be seen that by means of the handle 62 the lever arm 61 can be oscillated so that the pawl 60 will actuate its respective ratchet wheel 55 and thus move the carrier actuator or chain 52, and through means of its crank or pin 57 moves the slide arm 58 of the carrier 18.

In order to aid the operator, when manually shifting the carrier 18, to stop the latter at a predetermined position so as to make uniform exposures horizontally on the plate 21, I provide on the rear of the camera, at its lowermost edge, an index plate 63 having a series of numerals as "2—2" arranged in a horizontal line, numbers "3—3—3" arranged in a lower line, and numbers "4—4—4—4" still lower. The numbers "2—2" indicate that two exposures are to be made horizontally at the upper edge of the plate 21, while the numbers "3—3—3" indicate that the plate is divided horizontally into three sections, etc.

The operator, when making the exposures shifts the carriage 18, to the lower edge of which is secured an indicating finger 64 which projects outwardly and over the index plate 63; the operator watching the moving finger 64 until it registers with one of the numbers indicating the divisions, horizontally, in which the plate will be exposed. Thus, when he has to make three exposures horizontally on a plate, the horizontally adjustable stops 16 are adjusted to give a predetermined width of aperture 10 in the wall 9; the width of this aperture being sufficient to make three equal exposures horizontally on the plate 21. As the operator reciprocates the handle 62, the intermittent side motion of the carrier 18 can be stopped when the index pointer 64 registers with the first numeral "3" on the index plate 63, whereupon the exposure may be made and the carrier 18 is then shifted again until the indicator finger 64 registers with the next number "3", and then again until the last number "3" is indicated.

As the carrier 18 approaches the extreme right or left-hand position in the camera frame 2, the plate-holder is automatically lowered by reason of the falling of the supporting pin 28′ from the supporting lug 30′ as the bar 30 is shifted. This alternately continues until the plate-holder has been lowered to the bottom of the carrier 18.

When the operator desires to make time exposures and manipulate the carrier 18 by hand, the shutter 5—6 will have been adjusted relative to the aperture 10, so that the opening between the radial edges 5—6 corresponds with the aperture 10 of the wall 9, and the shutter will not be actuated when the carrier 18 is shifted by means of the handle 62 with its associated elements.

The downward movement of the plate-holder 20 may be accelerated, when desired, by any suitable means, such, for instance, as a spring 70 connected to a convenient portion of the plate-holder and also to a convenient part of the camera.

Having thus described my invention, what I claim and desire to secure by Letters Patent is—

1. The combination in a photographic apparatus, of a case having a transverse wall with an aperture, horizontally adjustable light stops movable over the aperture, a vertically movable light stop to fix the height of the aperture, and means for reciprocating a sensitized medium in the rear of the aperture to form a series of vertically superposed rows of consecutive exposures, said means comprising a carriage, driving mechanism therefor, and a variable stroke feed device for actuating said mechanism.

2. A photographic device provided with a case into which actinic light rays may enter, a transverse wall in the case having an aperture, horizontally adjustable stops for varying the area of the aperture, a rotary shutter movable over the aperture to cut off the light intermittently, a transversely movable carrier, a plate-holder adjustable and vertically movable in the carrier, a device for lifting the plate-holder to initial position and then lowering its slide, a detachable rest on the carriage, means on the plate-holder coöperating with said rest to lower the plate-holder in successive steps vertically, and means for laterally reciprocating the carrier with intermittent steps.

3. A photographic device provided with a case into which actinic light rays may enter, a transverse wall in the case having an aperture, horizontally adjustable stops for varying the area of the aperture, a rotary shutter movable over the aperture to cut off the light intermittently, a transversely movable carrier, a plate-holder adjustably and vertically movable in the carrier, a device for lifting the plate-holder to initial position and then lowering its slide, a reciprocating slide on the back of the carrier, an escapement member on the plate-holder engageable with the slide, and means for laterally reciprocating the carrier with intermittent steps and rotating the shutter.

4. The combination in a camera, of a carrier adapted to be shifted laterally, a vertically movable plate-holder therein, an escapement gate having a series of spaced projections on one face, means to removably secure said gate to the plate-holder, and a slide on the carrier for supporting the plate-holder while moving transversely with the carrier.

5. The combination in a camera having a transverse partition with a light aperture, of a carrier movably mounted behind said partition, a shutter for controlling the passage of light through the aperture, a plate-holder slidably mounted in the carrier, light stopping diaphragms adjustable over the aperture for varying the size thereof, and means for reciprocating the carrier in intermittent steps of a length substantially equal to the predetermined width of the light aperture, said means including an adjustable crank device for transmitting and translating the continuous movement into a reciprocating movement.

6. In a camera, the combination with a camera box, of a transverse wall having an aperture for the transmission of light, a shutter movable on one side of the wall to interrupt the passage of light through the aperture, a carrier slidably mounted on the opposite side of the wall for holding a light sensitive medium, a fixed index plate adjacent to one side of the aperture, light stopping diaphragms adjustably mounted upon the wall for the purpose of producing light apertures of variable sizes, said diaphragms being adjustable with relation to the fixed index plate, and means for moving the carrier predetermined steps to expose sections of the plate of equal size to the aperture formed by the diaphragms.

7. In a camera, the combination with a camera box having an aperture for the transmission of light, of a carrier slidably movable across the camera box in successive steps of variable length, means for varying the size of the light opening as determined by the length of the steps of the slide, a plate-holder adjustably and slidably mounted in the carrier, means for varying the vertical height of the light aperture of the camera, and means for controlling the vertical movement of the plate-holder in the carrier in proportion to the height of the light aperture, said means comprising an escapement device mounted on the carrier and coöperable with a device on the plate-holder providing for intermittent vertical movement of a predetermined amount.

8. In a camera, the combination with a camera box having a transverse wall with a light opening, of means for varying the height and width of the light opening, a carrier slidably mounted in the camera box on one side of said wall, a rotary shaft, a driving mechanism therefor, and means for translating the rotary motion of the shaft into a reciprocating motion, and connected to and operating said carrier, said means including a variable throw crank device for regulating the length of the successive step movements of the carrier.

9. In a camera, the combination with a camera box having a transverse wall with a light opening, of means for varying the height and width of the light opening, a carrier slidably mounted in the camera box on one side of said wall, a rotary shaft, a driving mechanism therefor, means for translating the rotary motion of the shaft into a reciprocating motion, and connected to and operating said carrier, said means including a variable throw crank device for regulating the length of the successive step movements of the carrier, a plate-holder adjustably mounted for vertical movement in said carrier, an escapement mechanism for permitting a step by step sliding movement of the plate-holder on the carrier, said mechanism including a rest supported on the carrier and adapted to be shifted in opposite directions alternately by engagement with the opposite walls of the camera box when the slidable carrier approaches the same, and interchangeable escapement devices, any one of which is adjustable upon the plate-holder and coöperates with said slidable rest to support the plate-holder while the carrier and plate-holder are moving transversely of the camera and operating to release the plate-holder to permit its descent a predetermined distance when the carrier reaches its extreme positions at the sides of the camera.

10. In a camera, the combination with a camera box having a transverse wall with an aperture, of a vertically adjustable light stopping diaphragm for increasing or decreasing the height of the aperture, an indexed arm connected to said diaphragm for moving same and indicating its relative position, and a plate-holder vertically movable in the camera in steps of variable length so that the plate may be divided into a number of vertically superposed areas coincident with the number of divisions indicated by the indexed arm of the diaphragm.

11. In a camera, the combination with a camera box having a transverse wall with an aperture, of a vertically adjustable light stopping diaphragm for increasing or decreasing the height of the aperture, an indexed arm connected to said diaphragm for moving same and indicating its relative position, a plate-holder vertically movable in the camera in steps of variable length so, that the plate may be divided into a number of vertically superposed areas coincident with the number of divisions indicated by the indexed arm of the diaphragm, means for varying the width of the opening, and an index, with relation to which said means are adjustable, which indicates the number of horizontal divisions into which the plate may be divided, according to the disposition of the horizontal diaphragm.

12. In a camera, the combination with a camera box having a transverse wall with an aperture, of a vertically adjustable light stopping diaphragm for increasing or decreasing the height of the aperture, an indexed arm connected to said diaphragm for moving same and indicating its relative position, a plate-holder vertically movable in the camera in steps of variable length so that the plate may be divided into a number of vertically superposed areas coincident with the number of divisions indicated by the indexed arm of the diaphragm, means for varying the width of the opening, an index, with relation to which said means are adjustable, which indicates the number of horizontal divisions into which the plate may be divided according to the disposition of the horizontal diaphragm, and means for moving the plate-holder transversely across the camera in steps proportionate to the size of the opening determined by the horizontal diaphragm.

13. In a camera, the combination with a casing having a partition provided with a light aperture, of a rotary shutter on one side of the partition and coöperating with said aperture, a traveling carrier having a step by step movement on the other side of the partition, means for operating the shutter and carrier synchronously, and means for varying the length of step movement of the carrier without varying the speed of rotation of the shutter.

14. In a camera, the combination with a casing having a partition provided with a light aperture, of a rotary shutter on one side of the partition and coöperating with said aperture, a traveling carrier having a step by step movement on the other side of the partition, means for operating the shutter and carrier synchronously, and means for varying the length of step movement of the carrier without varying the speed of rotation of the shutter, said last named means including a variable crank connected with the shutter.

15. In a camera, a casing having an aperture, a horizontal indexed strip forming the lower edge of said aperture, horizontally adjustable stops on said strip, and a vertical light stop common to both of the horizontal stops and extending across both.

16. In a camera, a carriage, a plate holder vertically movably supported by the carriage, interchangeable members connected to the holder and having staggered pins, a shift bar movably connected to the carriage and having a part which engages the pins to support the holder, and means to reciprocate the carriage whereby to cause the bar to engage a stationary point so as to successively move said part from under the pins.

17. In a camera, a carriage, a plate holder vertically movably supported by the carirage, a vertical series of staggered projections on the holder, means to reciprocate the carriage, and means operated by the carriage movements to support said holder by engagement with the projections and to be moved from beneath a lower projection into the path of the succeeding upper projection.

18. In a camera, a carriage, a plate holder vertically movably supported thereby and having a vertical series of staggered projections, and reciprocating means successively engaging said projections and being moved so that upon disengagement with a lower projection same will be moved into the path of the succeeding upper projection.

In testimony whereof I have hereunto set my hand in the presence of two subscribing witnesses.

JAMES W. ANDERSON.

Witnesses:
 JOHN H. HERRING,
 W. W. HEALEY.